United States Patent
Frost et al.

(10) Patent No.: US 7,596,716 B2
(45) Date of Patent: Sep. 29, 2009

(54) METHOD AND SYSTEM FOR MANAGING NETWORKS

(75) Inventors: Lee Kevin Frost, Roseville, CA (US); Michael Paul Hauger, Antelope, CA (US); Gregory A. Cottrill, Folsom, CA (US); William Paul Burdgick, Rocklin, CA (US)

(73) Assignee: Sobha Renaissance Information Technology, Karnataka (IN)

( * ) Notice: Subject to any disclaimer, the term of this patent is extended or adjusted under 35 U.S.C. 154(b) by 623 days.

(21) Appl. No.: 10/901,608

(22) Filed: Jul. 29, 2004

(65) Prior Publication Data

US 2006/0026453 A1  Feb. 2, 2006

(51) Int. Cl.
*G06F 11/00* (2006.01)

(52) U.S. Cl. .................................................. 714/25

(58) Field of Classification Search ........................ None
See application file for complete search history.

(56) References Cited

U.S. PATENT DOCUMENTS

| | | | | |
|---|---|---|---|---|
| 5,828,830 A | * | 10/1998 | Rangaraian et al. ........... 714/48 |
| 6,601,185 B1 | * | 7/2003 | Bass et al. ...................... 714/4 |
| 6,633,312 B1 | * | 10/2003 | Rochford et al. ............. 715/736 |
| 6,633,835 B1 | | 10/2003 | Moran et al. |
| 6,671,818 B1 | | 12/2003 | Mikurak |
| 6,829,639 B1 | * | 12/2004 | Lawson et al. ............... 709/224 |
| 6,907,545 B2 | * | 6/2005 | Ramadei et al. ............... 714/25 |
| 7,080,287 B2 | * | 7/2006 | Salem .......................... 714/38 |
| 2004/0031059 A1 | * | 2/2004 | Bialk et al. .................. 725/129 |
| 2004/0060073 A1 | * | 3/2004 | Bialk et al. .................. 725/129 |
| 2004/0064758 A1 | * | 4/2004 | Novik et al. ................... 714/37 |
| 2004/0107277 A1 | | 6/2004 | Levesque et al. |
| 2005/0015667 A1 | * | 1/2005 | Aaron .......................... 714/25 |
| 2005/0097396 A1 | * | 5/2005 | Wood .......................... 714/25 |
| 2006/0149990 A1 | * | 7/2006 | S. et al. ........................ 714/1 |
| 2006/0258348 A1 | * | 11/2006 | Rajala ......................... 455/423 |

* cited by examiner

*Primary Examiner*—Michael C Maskulinski
(74) *Attorney, Agent, or Firm*—Holland & Hart LLP

(57) ABSTRACT

The system and method of the present invention apply information filters (83A) hierarchically to information (14) such as, for example, alerts/events generated by an operational electronic system (10). Further, the system and method can display the results of the application of the information filters (83A) to information (14).

2 Claims, 9 Drawing Sheets

METHOD AND SYSTEM FOR MANAGING NETWORKS

BACKGROUND OF THE INVENTION

This invention relates generally to electronic systems, and more particularly to the management of electronic systems.

An electronic system may include, but is not limited to computer hardware, software, telecommunications equipment, and any other kind of electronic device. During electronic system operation, a system administrator (which may be a human or an electronic device) may receive information, for example alerts/events, simultaneously from various parts of the electronic system. Some information may be strictly informative, while other information may require action on the part of the system administrator. The system administrator may have to prioritize activities, depending upon the nature of the received information. Prior art filtering systems allow the system administrator to apply simple or complex filters to the information, one at a time, in order to sort the information and thus assist the system administrator in prioritizing activity that might be based on the received information which may be alerts, events, or any other type of information. A user may currently create a filter that views different sets of alerts, for example, but to monitor all of the different conditions simultaneously requires a discrete filter to be created for every type of condition. Effective filtering systems require large libraries of filters to cover all cases, as typically electronic alert and event messages contain dozens of filterable attributes. Further, the system administrator or any other user might be constrained by finite display size when visually reviewing the results of filtering, which might be displayed in, for example, tabular or graphical form, for each filter.

More sophisticated methods of summarizing, correlating and visualizing information from potentially hundreds of thousands of managed electronic elements are needed by electronic system infrastructure providers, who are striving to manage increasingly more and more complex electronic systems with less manpower than in previous years. Prior methods require either end-users to create and manage potentially thousands of individual and discrete electronic system information filters, or manually correlate potentially thousands of electronic system alert messages, in order to make decisions on when and where human intervention is required to service elements of the electronic system.

SUMMARY OF THE INVENTION

The problems set forth above as well as further and other problems are resolved by the present invention. The solutions and advantages of the present invention are achieved by the illustrative embodiments described herein below.

The system and method of the present invention provide filtering and summarization of large volumes of asynchronous information, including alert and event messages, generated by an electronic system. The filtered and summarized asynchronous information can feed a user-selected interface, which has a primary purpose of providing guidance as to which conditions require intervention. The asynchronous information may be generated by, for example, hardware devices or software processes in a computer network, and may originate from, for example, a single computer system or from a vast distributed heterogeneous network made up of hundreds, thousands, or even millions of devices.

The system and method of the present invention provide tools to aid in understanding and responding to information such as, for example, errors and faults in a complex distributed heterogeneous electronic system in order to, for example, more quickly spot trouble in the computer system. The system and method of the present invention overcome prior art limits of alert and event visualization and management tools by creating a more advanced method of filtering messages and a new method of organizing and visualizing the results of filtering in real-time. Specifically, the system and method of the present invention provide for applying information filters, pre-selected and dynamically created, hierarchically, and employing a visualization technique that communicates the hierarchical application of the information filters, and for displaying the results of the application of the information filters through a display technique that helps a user to visualize, in real-time, the results of each filter. Furthermore, a user may access the detailed results of any filter at any level in the hierarchy. The result is a system for producing management information to guide, for example, a system administrator in reacting to situations arising in the electronic system.

The system and method of the present invention enable visualization of problem areas in an electronic system, for example, a managed network. Problem areas, or alerts, are summarized by the system and method of the present invention, and the alert summaries are related to each other in hierarchies such that a parent summary can pre-filter all alerts passed to a child summary. The child summary can further filter the alerts, and ultimately an alert list can be made available for display or further processing for a purpose of providing management information.

Prior art systems require complex filters such as "select alerts from Rochester on Router devices that are critical in severity", or "select alerts from Buffalo on Router devices that are critical in severity" to filter alerts/events in a piecemeal way. The system and method of the present invention allow simple and/or complex filters to be created and then applied hierarchically, as needed: "select alerts from Rochester", "select alerts from Buffalo", "select alerts on Routers", "select critical alerts". Complex filtering is achieved by combining simple, reusable filters rather than creating and maintaining large libraries of complex filters. Far fewer filters are needed for users to manage the alerts/events in their electronic systems. Individual filters can be much simpler and they can be reused as filter building blocks.

In the system and method of the present invention, a view model can represent relationships among alert/event views. For example, an alert/event view can be a parent to one or more child alert/event views, and in that case, only alerts/events that have passed through the parent filter can reach the child view. The hierarchy can extend to as many levels as necessary. In an illustrative embodiment, filtered views can have individual characteristics that are not passed down from parent to child. Also in an illustrative embodiment, the usefulness of a hierarchy tree can be enhanced by highlighting features of the tree by, for example, font variations, colored/sized spots, and by providing summary information, for example, alert counts. It could be possible for these enhancements to be customized, there could be default enhancements, and certain enhancements could be pre-set and unchangeable. For example, a view model could allow for the utilization of a combination of bold versus plain fonts, alert, counts, and various sized colored/shaded spots to quickly show some important alert information about the various nodes contained in the tree. Some of these indicators can be customizable by the user, providing some flexibility in the look-and-feel of an alert tree panel.

For a better understanding of the present invention, reference is made to the accompanying drawings and detailed description. The scope of the present invention is pointed out in the appended claims.

DETAILED DESCRIPTION OF THE INVENTION

Figure 1:
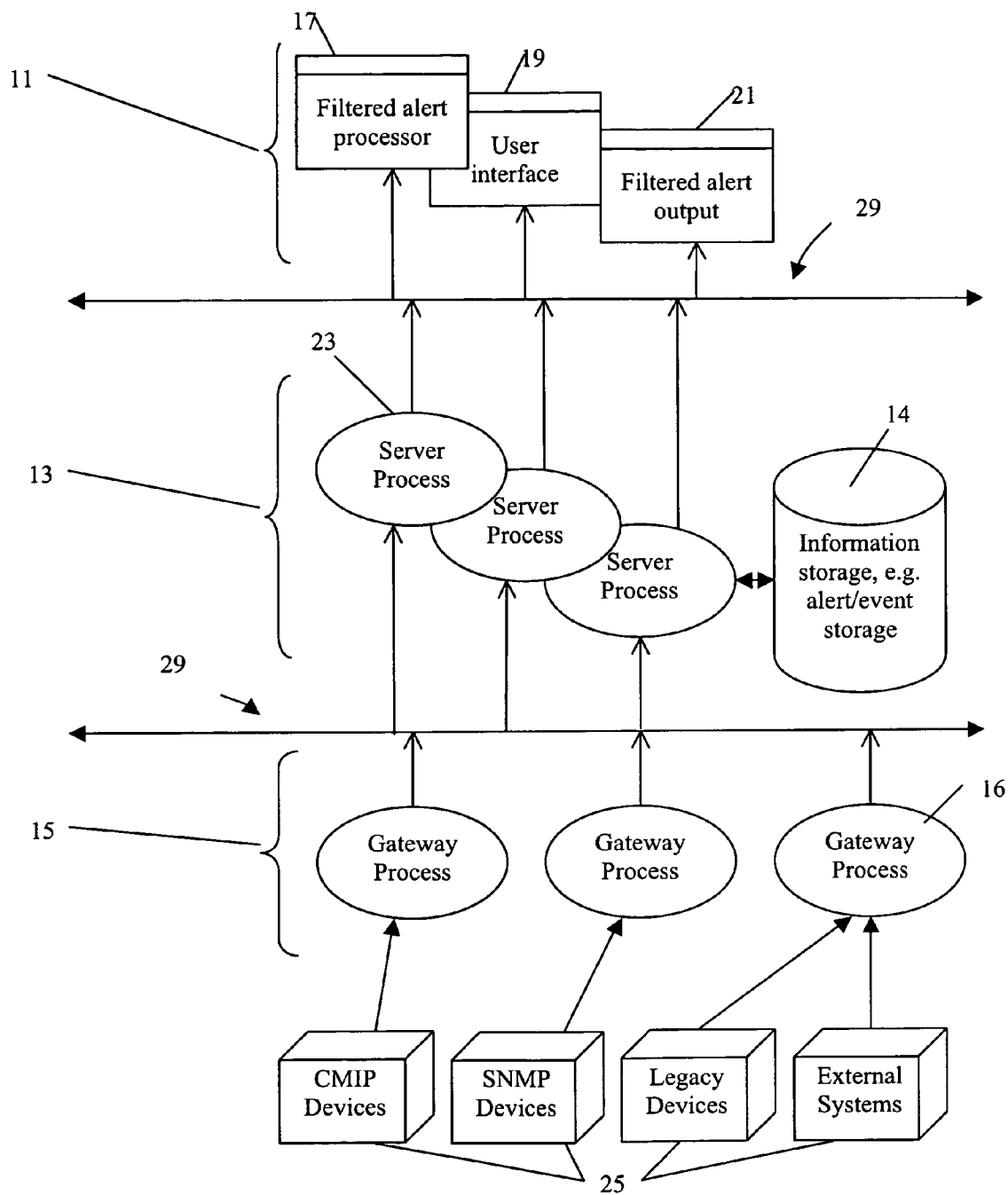
FIG. 1 is a schematic block diagram of a logical view of the system of the present invention.

The present invention is now described more fully hereinafter with reference to the accompanying views of the drawing, in which the illustrative embodiment of the present invention is shown. Note that the term "alerts/events" is used throughout this specification as a specific example of the more general "information" for which the filtering of the present invention is applicable.

Referring now to FIG. 1, a logical view of electronic system 10 (shown specifically in FIG. 2) of the present invention can include presentation layer 11, execution layer 13, and interface layer 15, which communicate through electronic interface 29. Presentation layer 11 provides alert/event filtering and presentation by accepting preferences and other information from user interface 19, processing alerts/events through hierarchical filtered alert processor 17, and presenting filtered alerts/events to requesters through filtered alert output 21. Execution layer 13 provides alert/event "normalizing" through at least one server process 23 that performs management, analysis, modeling, and data storage functions on information 14, for example alert/event information. Interface layer 15, the primary reception point for alerts/events generated by the electronic system, provides network interface and mediation layers that receive data from at least one gateway process 16. Gateway process 16 can provide an interface for network elements 25 which can include, for example, CMIP devices, SNMP device, legacy devices, and external systems.

Figure 2:
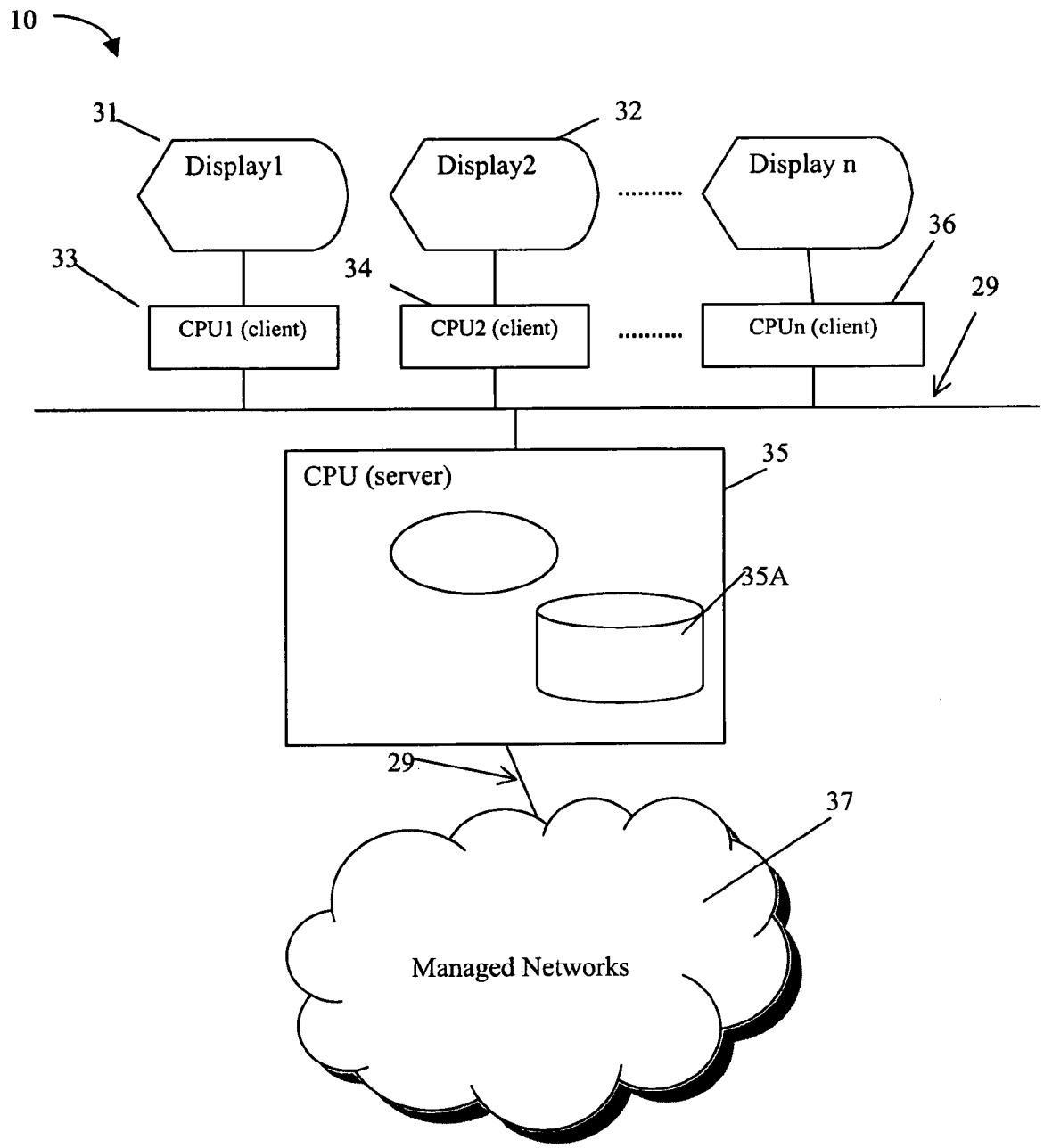
FIG. 2 is a schematic block diagram of the system of the present invention.

Referring now to FIG. 2, the physical environment of electronic system 10 of the present invention can include client CPU1 33, client CPU2 34, and as many clients CPUn 36 as desired, each optionally connected to at least one user-selected location, e.g. DISPLAY1 31, different from a user-selected location, e.g. DISPLAY2 32, etc., respectively. Electronic system 10 can also include at least one computer node acting as a server CPU 35, having access to at least one computer readable medium 35A, which communicates with client CPU1 33 (and other client CPUs) and at least one managed network 37, including, for example, a communications network or a storage network, by electronic interface 29. The system and method of the present invention can execute on any CPU in electronic system 10, preferably on client CPU1 33, client CPU2 34, or any of the client CPUn 36 connected through electronic interface 29 (FIG. 1) to at least one managed network 37. CPU1 33, for example, could execute hierarchical filtering 40 (see FIG. 3) against alerts/events generated by the various elements of electronic system 10, including alerts/events, generated by any server 35 that is part of electronic system 10, that may be captured, filtered, and summarized by hierarchical filtering 40. Summary information may be displayed on DISPLAY1 31, and display formatting can be saved on server 35. If an alert/event viewing session is suspended, a user may continue viewing alerts/events at a later time on, for example, DISPLAY2 32 which can access any save user-specific information from server 35 through electronic interface 29.

Figure 3:
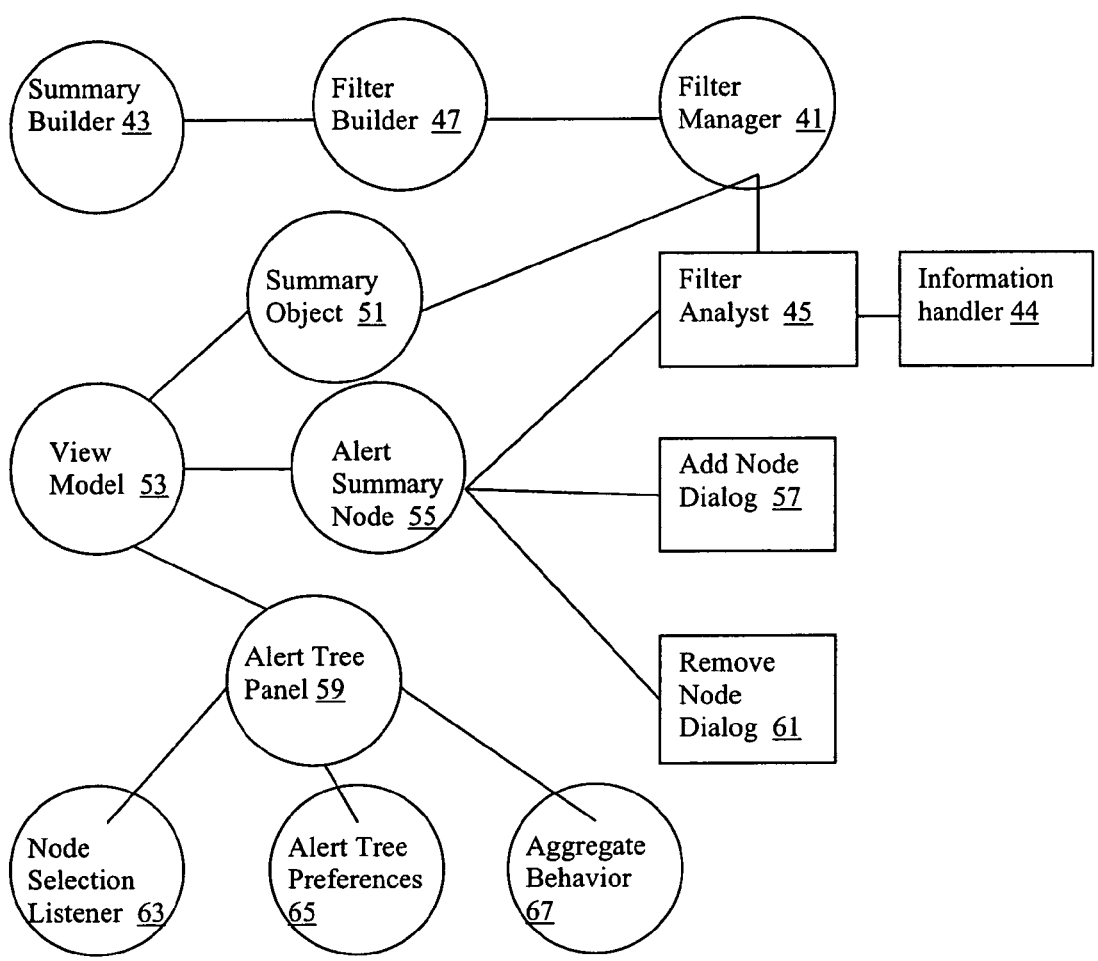
FIG. 3 is a schematic block diagram of the objects (encircled) and their associated methods (boxed) of the system of the illustrative embodiment of the present invention.

Referring now to FIG. 3, hierarchical filtering 40 by the present invention can include objects such as, for example, summary builder 43, filter builder 47, filter manager 41, summary object 51 containing management information, view model 53, alert summary node 55, alert tree panel 59, node selection listener 63, alert tree preferences 65, and aggregate behavior 67, which are acted upon by methods such as, for example, filter analyst 45, add node dialog 57, information (e.g. alert/event) handler 44, and remove node dialog 61. In the illustrative embodiment, as a precondition for operation, filter manager 41 makes predefined and newly created filters available to methods that manipulate the filters, such as filter builder 47, and to objects that store aspects of the filters such as summary object 51. A filter tests the contents and attributes of each alert/event to determine if it satisfies the condition of that filter. Filter analyst 45 allows for the creation of filter hierarchies that process alerts/events first through top-level, for example broad-based, filters, and then through second-, third-, etc. level, for example narrower, filters, repeatedly to the level of granularity required by a condition or state of electronic system 10. Filter builder 47 allows filters to be combined, perhaps by the user of logical operators such as "and", "or", and "not". For example, a system that can process 500,000 alerts per day may subject the alerts to a broad-based filter that selects alerts based upon where the alerts are generated, for example, in a specific geographic area, for example, New York State. If, for example, 50,000 alerts are generated per day from electronic system 10 in New York State, these alerts can then be processed by filters that select alerts by major city, for example, New York City, Rochester, Buffalo and Albany. Continuing with the example, 25,000 alerts may be generated by New York City, 10,000 alerts may be generated by Rochester, 9,000 alerts are generated by Buffalo, and the remaining 6,000 alerts may be generated by Albany. If further filters are applied that select alerts based on the type of network device that emitted the alerts, for example, routers, switches, cross-connects, etc., and then even further filters are applied that select alerts based on the priority of the alert, for example, critical, major, minor, etc., the result might appear as follows:

All Alert Messages (500,000)
  _New York State (50,000)
  _New York City (25,000)
  _Rochester (10,000)
  _Buffalo (9,000)
  _Albany (6,000)
    _Routers (2,000)

_Critical (50)
_Major (1000)
_Minor (950)
_Switches (2,500)
_Critical (100)
_Major (900)
_Minor (1000)
_Cross-connects (1,500)
_Critical (500)
_Major (700)
_Minor (800)

Figure 7A:
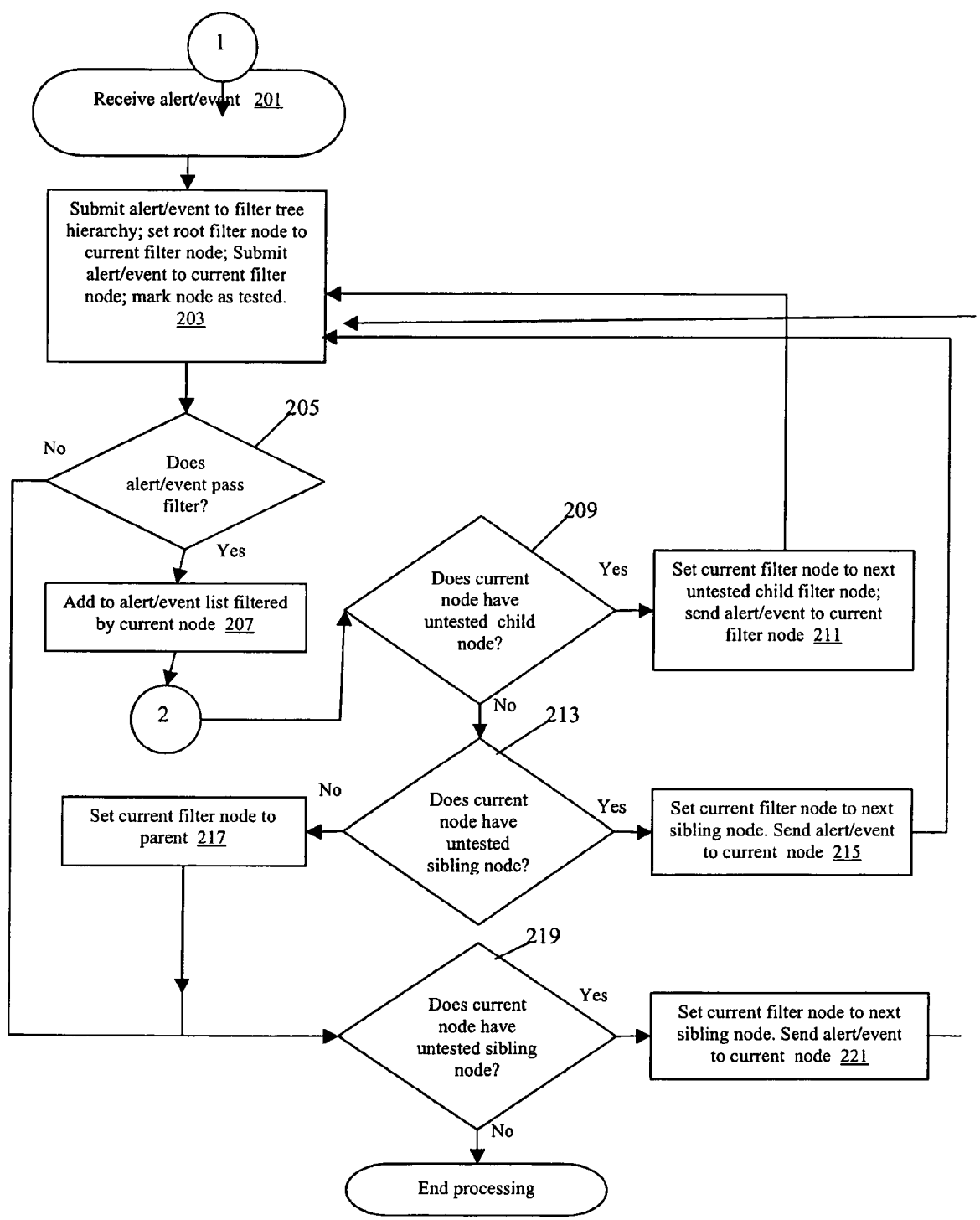
FIGS. 7A-C are flowcharts of alert/event processing and visual indicator size selection in accordance with the hierarchical filters of the illustrative embodiment of the present invention.
Figure 7B:
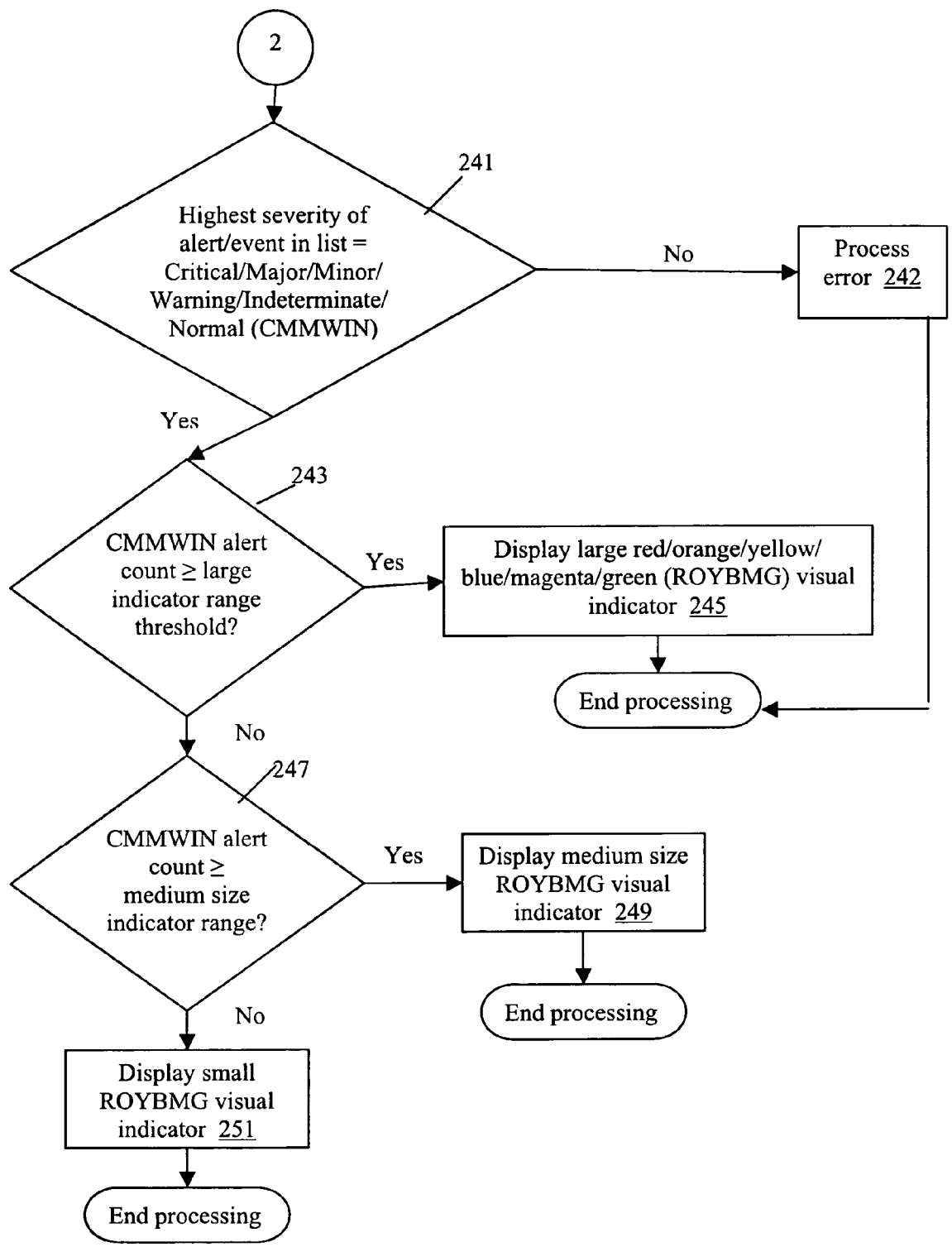
Figure 7C:
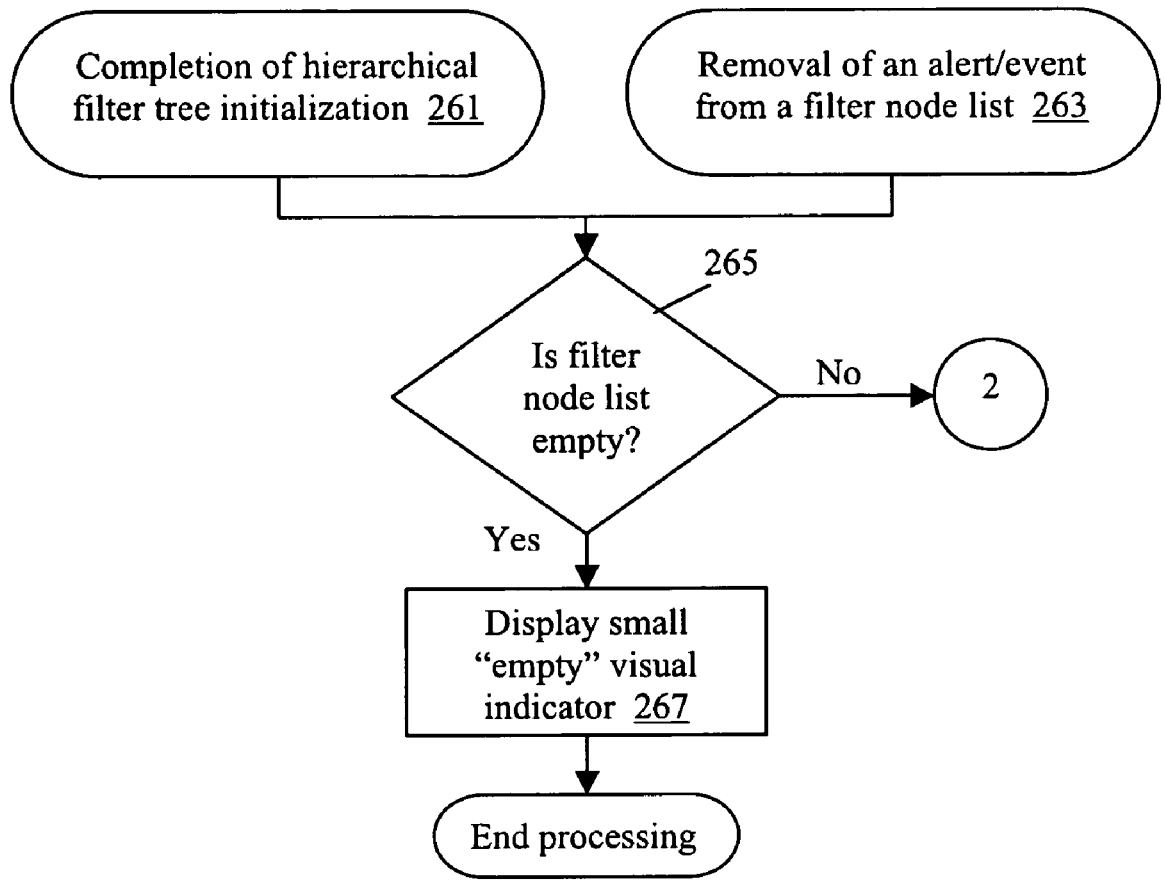

Continuing to refer to FIG. 3, information handler 44 receives alerts/events, accesses the filter hierarchies created by filter analyst 45, processes alerts/events according to the method described in FIGS. 7A-C, and stores the results as management information in, among other places, summary object 51. Summary builder 43 can summarize those results, for example in the form of total alert/event counts, for storage, for example, in alert summary node 55. A filter hierarchy can include of nodes, and maintaining the filter hierarchy can be enhanced by methods to add and remove nodes, for example, add node dialog 57 and remove node dialog 61, respectively. Results of these operations can be stored, for example, in alert summary node 55. Aggregate behavior 67 can provide views from view model 53 through alert tree panel 59, which can be modified according to the user's needs by alert tree preferences 65. Views can be dynamically updated by node selection listener 63.

Continuing to refer to FIG. 3, hierarchical filtering 40 can be implemented in such a way that the objects and methods are preserved on server 35 (FIG. 2). Thus, when a user suspends a session of viewing alerts/events, the user's views are persisted in, for example, a view model 53 object, and when the user returns to viewing alerts/events, no matter from which location within electronic system 10, the user's views can be made accessible.

Figure 4:
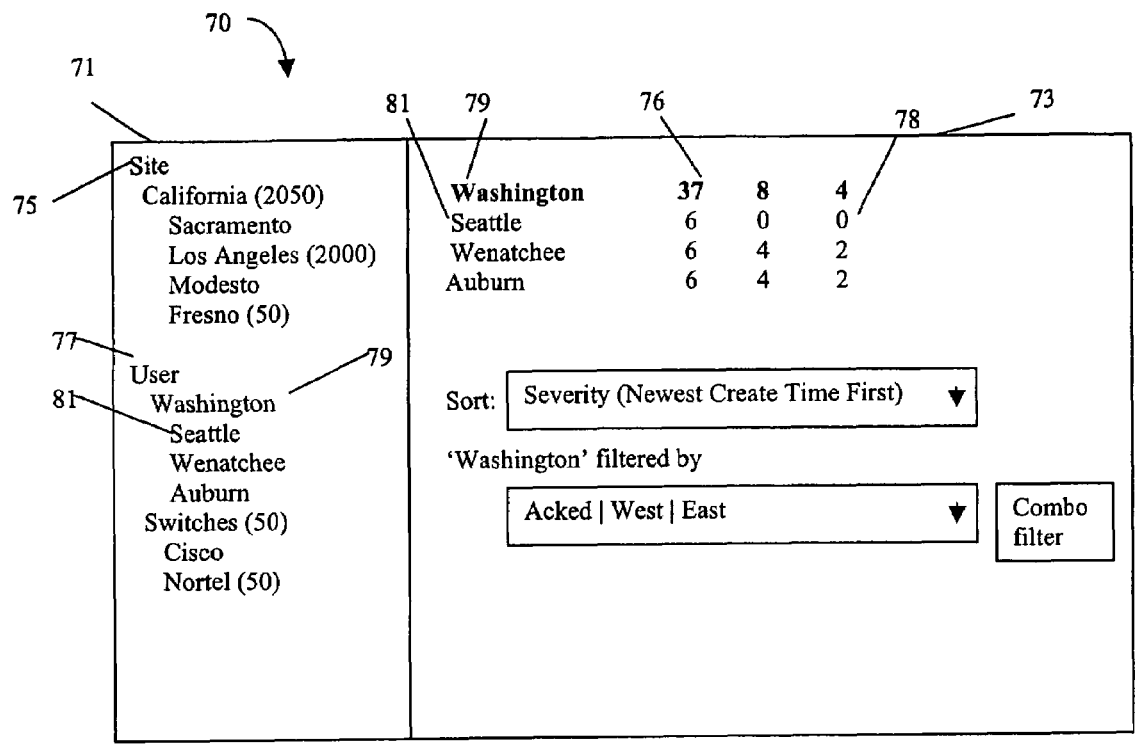
FIG. 4 is a screen layout of an illustrative node tree with alert count summaries created by the system and method of the present invention.

Referring now primarily to FIG. 4, the hierarchical relationships of electronic system 10 (FIG. 2) components can be shown as a tree structure, and, in the illustrative embodiment, nodes in the tree can support visual indicators that can be used to draw attention to a particular segment of electronic system 10, for example a segment of managed network 37 (FIG. 2). Alert tree preferences 65 (FIG. 3) can divide an alert navigator window 70 into alert tree panel 59 (FIG. 3) objects, for example two alert tree panel 59 objects: selection panel 71 and view panel 73. Alert tree preferences 65 can allow the user to customize selection panel 71 by allowing the user to select which filtered view of electronic system 10 components to display. Likewise, alert tree preferences 65 can allow the user to customize view panel 73 to show detailed information about the selected component such as the alert list, summary information, and charts. Hierarchical filtered alert views can be, for example, general views 75, or can be user-specific views 77. Alert tree preferences 65 can allow general views 75, for example, to be predefined by a system administrator, and can allow user-specific views 77 to be defined by individual users.

Continuing to refer to FIG. 4, when a user selects a "leaf node" (a child node 81 that is not itself, also, a parent node 79), alert summary node 55 (FIG. 3) can display, for example, in view panel 73, an alert summary 76, an alert chart (not shown), and an alert list 78 defined by child node 81. When a user selects parent node 79, aggregate behavior 67 can display, for example, alert summaries and alert graphs for the parent node 79 and each first-level child node 81. In the summary table, the user can see, for example, the selected parent node alert summary 76 in, for example, bold-faced font, and the parent's first generation child node alert list 78 in light-faced font. Alert list 78 can display the alerts for parent node 79. If the user selects a child node 81 in the summary table, then the alert list can, for example, show the alerts filtered by that child node. User-specific views 77 can be created by use of, for example, add node dialog 57 (FIG. 3). The user could be allowed to choose, for example, the name of the view, how the view is sorted, how the view is displayed, and any filters used on the view, and this information is stored in summary object 51 (FIG. 3). General views 75 can be created and updated by, for example, system administrators, and can then be published to all users.

Figure 5A:
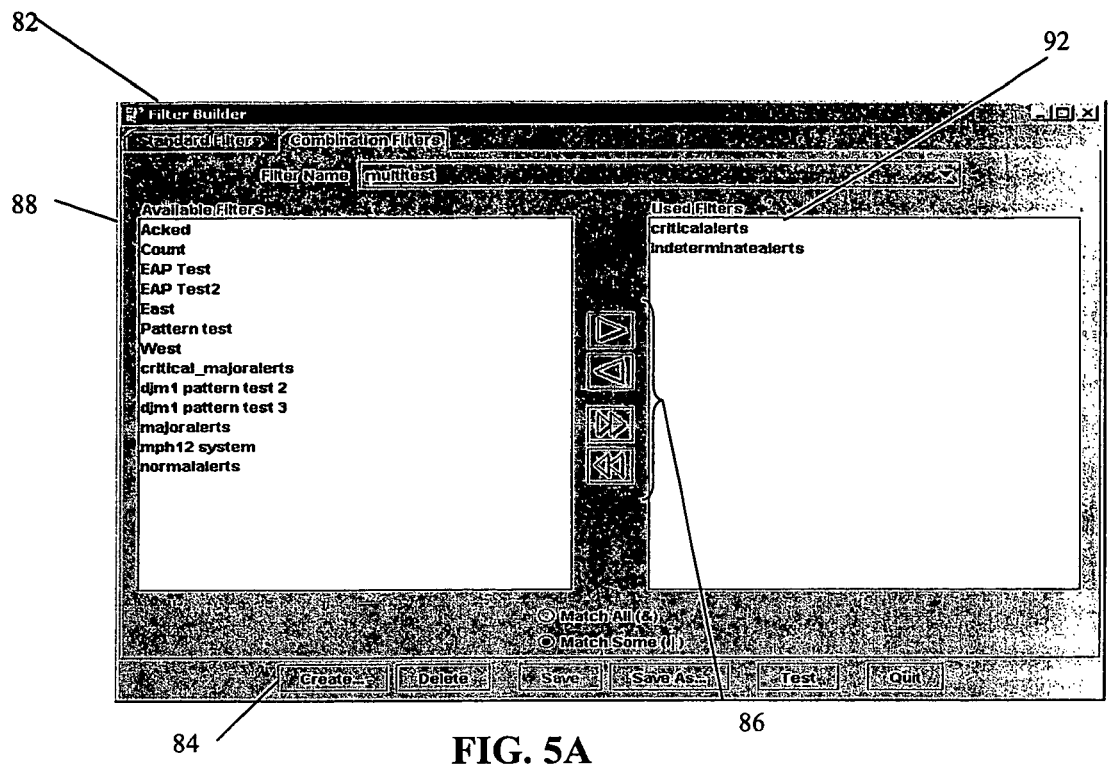
FIG. 5A is a screen view of an illustrative filter builder screen created by the system and method of the present invention.

Referring now to FIG. 5A, exemplary filter builder screen view 82 illustrates available filters 88 that can be used to filter alerts/events. To select a filter, the user could click on a "move" arrow 86 which could move the selected filter to the used filter pane 92. To create a new filter, perhaps a filter that is a combination of more than one filter, the user could click on create button 84. Any number of filters can be applied to an alert list. Logical operations, for example 'and', 'or', and 'not', can be performed on these filters.

Figure 5B:
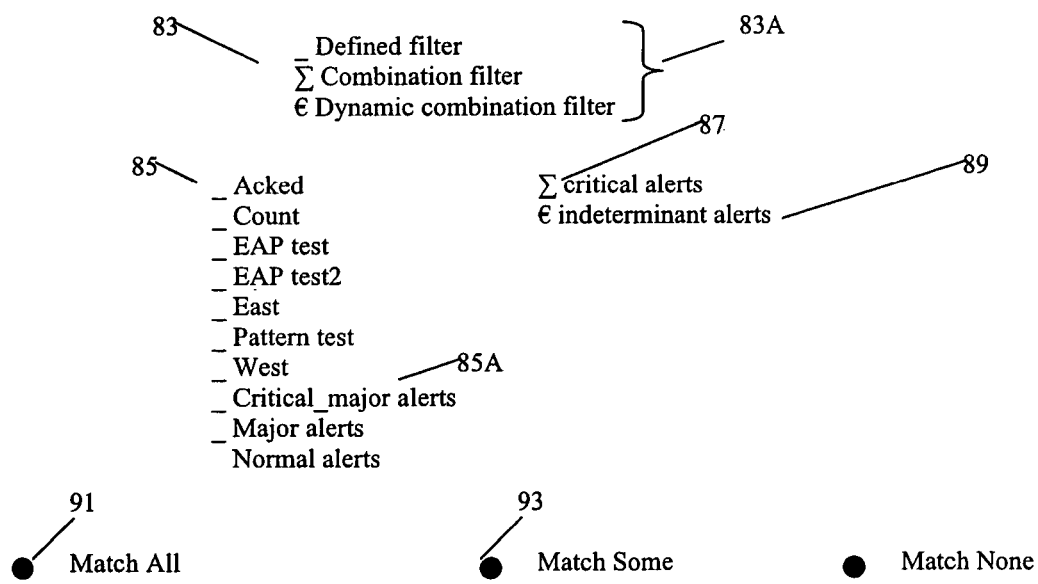
FIG. 5B is a user interface diagram of an illustrative user interface for combining filters.

Referring now primarily to FIG. 5B, filter builder 47 (FIG. 3) can build new filters 87 from defined, i.e. pre-selected, filters 85 that can include, for example, at least one alert/event filter 85A. Filter builder 47 can allow the user to chose various types of filter combining functions to relate defined filters 85 to each other to form new filters 87, and can support user interface mechanisms such as, for example, radio buttons or check boxes. If the Match All radio button 91 (an example of an operator that creates at least one relationship) is selected, for example, filter builder 47 combines the selected defined filters 85 through a logical 'and' operation, that is, if an alert fails to pass any of the selected defined filters 85, the alert is filtered out of the alert list. If the Match Some radio button 93 is selected, filter builder 47 combines the selected defined filters 85 through a logical 'or' operation, that is, if an alert passes any of the selected defined filters 85, it is not filtered out of the alert list. Alternatively, filter builder 47 could combine defined filters 85 on an ad hoc basis (without creating a new filter 87). For convenience, filter manager 41 could, for example, temporarily save these "dynamic" filters 89 in a circular buffer and could retrieve them through a history pull-down, for example. To distinguish types of information filters 82 from each other, the system could provide filter-specific icons 83 that could appear in conjunction with the names of the information filter 83A.

Figure 6:
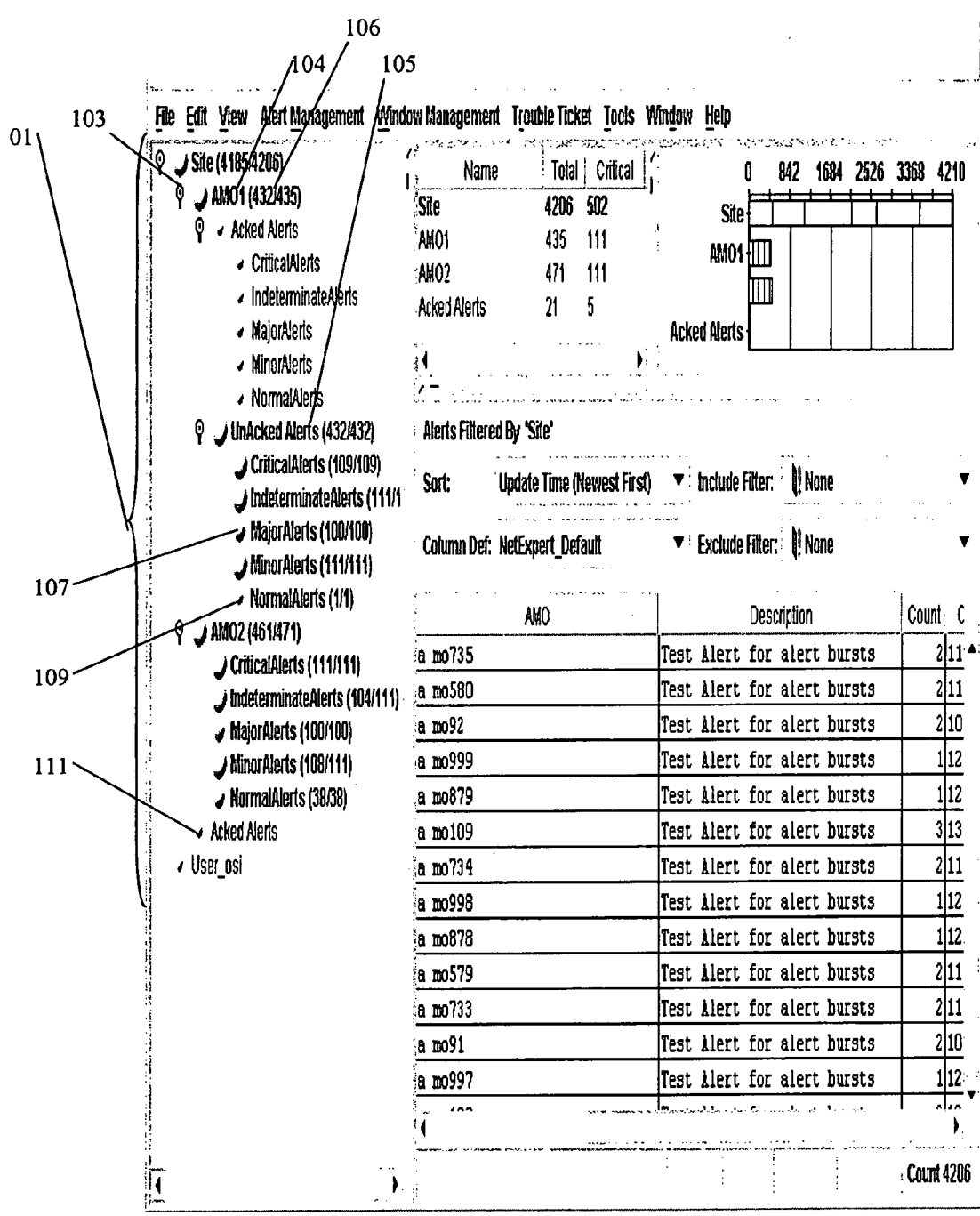
FIG. 6 is an screen view of an alert tree created by the system and method of the present invention.

Referring now primarily to FIG. 6, if there is one or more unacknowledged alert 105, in a user-selected form, e.g. an alert view tree or filter hierarchy 101 "node", aggregate behavior 67 (FIG. 3) can display the text of the alert tree node in a bold font. In addition, node name 104 could be followed by summarized management information 106, for example, unacknowledged alert count in parentheses, the number of unacknowledged alerts contained in node name 104. The system administrator could configure alert view tree 101 to show the entire filtered alert count of alerts filtered by that view also. Aggregate behavior 67 could display each node name 104 in the alert view tree 101 having a user-selected form 103, e.g. a colored/shaded spot before its name. The color/shade of colored/shaded spot 103 could correspond to the highest alert severity contained in node name 104. The size of colored/shaded spot 103 could indicate the number of alerts in node name 104 that are of that highest severity: the larger the spot, the greater the number of alerts, for example. Aggregate behavior 67 (FIG. 3) could allow the setting/resetting of default thresholds for values that correspond to the size/shading of colored/shaded spots 103. Colored shading such as red for critical messages, orange for major messages, yellow for minor messages, etc., can be used. A non-shaded or non-colored visual indicator can be used to visualize the situation where no alert messages passed through a filter. For example, if 1,000 or more alerts pass through a filter, a large visual indicator, for example the visual indicator depicted in colored/shaded spot 103, could be used. Alternatively, if between 100 and 999 alerts pass through the filter, a medium visual indicator 107 could be used. Further alternatively, if between 1 and 99 alerts pass through the filter, a small visual indicator 109 could be used. Finally if no alerts pass through a filter, a non-colored/non-shaded visual indicator 111 could be used.

As the user is browsing the views, if the user allows the keyboard pointing device, such as, for example, the mouse pointer, to hover over a node in the tree, the system of the present invention could be configured to display text, for example, a hint or tip. The tip could, for example, show characteristics of the alerts contained in the node, for example, severity counts.

Referring now to FIG. 7A, the method of hierarchical filtering 40 (FIG. 3) of the present invention includes the steps of receiving an alert/event (method step 201) by information handler 44 and submitting the alert/event to at least one hierarchical filter (method step 203) for a node that is currently being processed (the current node). If the alert/event passes the filter (decision step 205), the method can include the steps of adding the alert/event to an alert/event list that is maintained for the current node (method step 207), processing the visual display of the alert/event (see FIGS. 7B and 7C.). If the current node has an "untested" child node (decision step 209), the method includes the steps of setting up the child node for testing (method step 211) and continuing execution at method step 203. If the alert/event does not pass the filter (decision step 205), and the current node has an untested sibling node (decision step 219), the method can include the steps of setting up to test the untested sibling (method step 221), and continuing execution at method step 203. If the alert/event does not pass the filter (decision step 205), and the current node does not have an untested sibling node (decision step 219), then processing of the alert/event is complete. If the current node does not have an untested child node (decision step 209), and if the current node has an untested sibling node (decision step 213), the method can include the steps of setting up the sibling node for testing (method step 215) and continuing execution at method step 203. If the current node does not have an untested sibling node (decision step 213), the method can include the step of setting up to test the siblings of the parent node (method step 217) and continuing execution at decision step 219. If the current node does not have an untested child node (decision step 209), and if the current node has an untested sibling node (decision step 213), method step 215 can be executed as previously described. If the current node does not have an untested child node (decision step 209), nor does the current node have an untested sibling node (decision step 213), method step 217 can be executed as previously described. If all siblings of the parent have been tested (decision step 219), processing of the alert/event is complete.

Referring now primarily to FIG. 7B, after information handler 44 (FIG. 3) has added an alert/event to an alert/event list, node selection listener 63 (FIG. 3) can update any information about the alert/event list, such as, for example, visual indicators. For example, if the highest severity level of any alert/event in the list is any of "critical", "major", "minor", "warning", "indeterminate", or "normal", (CMMWIN) for example, (decision step 241), and a count of the CMMWIN alerts in the list is greater than or equal to a pre-defined "large indicator" threshold (decision step 243), the method includes the step of displaying a large visual indicator, for example, in the colors of red, orange, yellow, blue, magenta, or green respectively (ROYBMG) (method step 245), and concluding visual indicator processing. If the highest severity level of any alert/event in the list is not any of CMMWIN (decision step 241), and those are the only choices available in the system, the method includes the step of processing an error, and concluding visual indicator processing. If the count of the CMMWIN alerts in the list is less than the pre-defined "large indicator" threshold (decision step 243), and if the count of the CMMWIN alerts in the list is greater than or equal to a pre-defined "medium indicator" threshold (decision step 247), the method can include the steps of displaying, for example, a medium size ROYBMG visual indicator (method step 251), and concluding visual indicator processing. If the count of CMMWIN alerts in the list is less than the pre-defined "medium indicator" threshold (decision step 247), the method can include the steps of displaying, for example, a small ROYBMG visual indicator (method step 251), and concluding visual indicator processing.

Referring now to FIG. 7C, at either the conclusion of hierarchical filter tree initialization (entry point 261) or removal of an alert/event from a filter node list (entry point 263), if the filter node list is not empty (decision step 265), the method continues processing at decision step 241 (FIG. 7B). If the filter node list is empty (decision step 265), the method includes the step of displaying a small "empty" visual indicator (method step 267), and concluding visual indicator processing. At any conclusion of visual indicator processing, information handler 44 (FIG. 3) awaits further incoming alerts and updates alert/event lists according to this described method.

Although the invention has been described with respect to various embodiments and methods, it should be realized that this invention is also capable of a wide variety of further and other embodiments within the spirit and scope of the appended claims.

What is claimed is:

1. A method for managing a network comprising the steps of:
creating at least one hierarchical filter data structure comprising a plurality of information filter nodes, said plurality of information filter nodes including at least first, second and third information filter nodes located at first, second and third levels, respectively, of the hierarchical data structure, the first level being above the second level in the hierarchical filter data structure, the second level being above the third level in the hierarchical filter data structure, the first information filter comprising geographical information associated with a first geographical region, the first information filter being a parent node in the hierarchical filter data structure, the second information filter comprising geographical information associated with a second geographical region that is within the first geographical region, the second information filter being a child node of the parent node in the hierarchical filter data structure, and wherein the third information filter comprises network device information associated with a first network device, wherein the first network device is employed at a location in the network that is within the second geographical region;
creating a composite filter by logically combining at least two of the information filter nodes based on selections of information filter nodes made by a user via a graphical user interface (GUI) such that a logical relationship exists between the selected information filter nodes;

applying the composite filter to information generated by one or more network devices employed in the network to filter at least one alert/event included in the information generated by said one or more network devices;

creating management information based on the application of the plurality of information filters in order to manage the at least one electronic system;

summarizing the management information;

providing the summarized management information in at least one user-selected form to at least one user-selected location;

formatting the summarized management information according to criticality of the management information;

saving the management information; and saving the at least one user-selected form, wherein the at least one user-selected form can be accessed at a later time from a user-selected location different from the at least one user-selected location.

2. A system for managing a network, the system comprising:

means for creating at least one hierarchical filter data structure comprising a plurality of information filter nodes, said plurality of information filter nodes including at least first, second and third information filter nodes located at first, second and third levels, respectively, of the hierarchical data structure, the first level being above the second level in the hierarchical filter data structure, the second level being above the third level in the hierarchical filter data structure, the first information filter comprising geographical information associated with a first geographical region, the first information filter being a parent node in the hierarchical filter data structure, the second information filter comprising geographical information associated with a second geographical region, the second information filter being a child node of the parent node in the hierarchical filter data structure, and wherein the third information filter comprises network device information associated with a first network device, wherein the first network device is employed at a location in the network that is within the second geographical region;

means for creating a composite filter by using selections of at least two of said information filter nodes made by a user to create a logical relationship between the selected information filter nodes means for applying the composite filter to information generated by one or more network devices employed, in the network to filter at least one alert/event included in the information generated by said one or more network devices;

means for creating management information based on the application of said composite filter;

means for summarizing said management information;

means for providing said summarized management information in at least one user-selected form to at least one user-selected location;

means for formatting said summarized management information according to criticality of said management information;

means for saving said management information; and means for saving said at least one user-selected form, wherein said at least one user-selected form can be accessed at a later time from a different said at least one user-selected location.

* * * * *